United States Patent [19]

Kuwahara

[11] Patent Number: 5,023,499
[45] Date of Patent: Jun. 11, 1991

[54] EDDY CURRENT TYPE BRAKE SYSTEM

[75] Inventor: Touru Kuwahara, Kawasaki, Japan

[73] Assignee: Isuzu Motors Limited, Tokyo, Japan

[21] Appl. No.: 573,949

[22] Filed: Aug. 28, 1990

[30] Foreign Application Priority Data

Aug. 28, 1989 [JP] Japan .................. 1-218498

[51] Int. Cl.$^5$ .............................. H02K 49/04
[52] U.S. Cl. .......................... 310/105; 310/76; 310/77; 310/93; 188/164
[58] Field of Search ............ 310/105, 15, 52, 76, 310/77, 154, 265, 93, 67 R, 62, 63; 188/164, 267, 165, 159

[56] References Cited

U.S. PATENT DOCUMENTS

| | | | |
|---|---|---|---|
| 3,624,437 | 11/1971 | Hoyler | 310/93 |
| 3,723,795 | 3/1973 | Baermann | 310/93 |
| 4,128,147 | 12/1978 | Lafuente et al. | 188/164 |
| 4,853,573 | 8/1989 | Wolcott et al. | 310/105 |

Primary Examiner—Steven L. Stephan
Assistant Examiner—Edward H. To
Attorney, Agent, or Firm—Dykema Gossett

[57] ABSTRACT

An eddy current type brake system adapted to a vehicle comprises a drum-like rotor mounted on an output shaft of a transmission of the vehicle, a stator provided in the rotor and being able to reciprocate in an axial direction of the rotor, a plurality of permanent magnets mounted on the stator, a brake force producing device provided between the stator and the rotor for magnetically connecting the permanent magnets of the stator with the rotor to apply brake force to the rotor, and a device for magnetically cutting the permanent magnets of the stator from the rotor to release the brake force from the rotor. When the stator is moved to a position to face the brake force producing device, the permanent magnets of the stator are connected to the rotor magnetically and the eddy current is produced in the rotor so that the rotating shaft is decelerated. On the other hand, the deceleration force is no longer applied to the rotor as the stator is moved to face the brake force releasing device, since the permanent magnets of the stator are magnetically disconnected from the rotor. The magnetism of the permanent magnets is shielded by the releasing device so that the magnetism does not leak to the rotor. Therefore, it is possible to design a drum which has a larger drum width along the entire path of the reciprocating movement of the stator. It is possible to enlarge the surface area of the drum and improve the heat releasing property.

10 Claims, 5 Drawing Sheets

EDDY CURRENT TYPE BRAKE SYSTEM

BACKGROUND OF THE INVENTION

1. Technical Field

The present invention relates to an eddy current type brake system adapted for a vehicle and more particularly to an eddy current type brake system which produces eddy current in a rotor by use of permanent magnets.

2. Background Art

An eddy current type brake system is known as a vehicle retarder ensuring a stable continuous brake force in combination with a main brake (foot brake) and preventing burning of the main brake.

The eddy current type brake system generally includes a rotor mounted on a shaft, such as a propeller shaft, drivingly connected to wheels of a vehicle and a magnetic power source, such as an electro-magnet or a permanent magnet, mounted on a fixed portion, such as a frame of the vehicle, so as to be located near the rotor. The eddy current is produced in the rotor due to a relative velocity difference between the rotor (a rotary portion) and the magnetic power source (the stationary portion). The eddy current serves as the brake force against the rotation of the rotor, whereby the vehicle is decelerated.

When the eddy current flows in the rotor during the braking, the rotor becomes hot. The eddy current is considered as energy loss. Particularly, when the vehicle runs at a high speed, the rotor also rotates at a high speed and the time required for deceleration becomes long. Therefore, an amount of heat generated in the rotor becomes large and the temperature of the rotor raises rapidly.

The electrical resistance of the rotor becomes larger as the temperature of the rotor becomes high, which lowers the braking force of the rotor. Also, the heat of the rotor will deform the rotor. This deformation upsets the rotational balance of the rotor and/or lead to cracks in the rotor. Therefore, the longevity of the rotor is shortened.

The heat of the rotor is cooled by its own cooling capacity and it is advantageous for the rotor to have a large surface area in order to release the heat.

However, the space for the eddy current type brake system in the vehicle is limited. Thus, it is not possible to enlarge the surface area of the rotor by a large amount.

SUMMARY OF THE INVENTION

An object of the present invention is to provide an eddy current type brake system which is compact so that the rotor can have a larger surface area in the limited space available.

According to one aspect of the present invention, there is provided an eddy current type brake system comprising: a drum-like rotor mounted on a rotative shaft; a stator provided in the rotor and operative to reciprocate in the axial direction of the rotor; a brake means between the stator and the rotor for magnetically connecting the permanent magnets of the stator with the rotor to apply brake force to the rotor; and means for magnetically cutting the permanent magnets of the stator from the rotor to release the brake force from the rotor. According to this arrangement, when the stator is moved to a position to face the brake means, the permanent magnets of the stator are connected to the rotor magnetically and the eddy current is produced in the rotor so that the rotating shaft is decelerated. At this point, the rotor generates heat as energy loss due to the eddy current flowing through the rotor. The deceleration force is no longer applied to the rotor as the stator is moved to face the releasing means, since the permanent magnets of the stator are magnetically disconnected from the rotor. In this case, the magnetism of the permanent magnets is shielded magnetically by the releasing means so that the magnetism does not leak to the rotor which is positioned outside the releasing means. Therefore, it is possible to design a drum which has a larger drum width along the entire bath of the reciprocating movement of the stator. This means that it is possible to enlarge the surface area of the drum which releases the heat and accordingly that the heat releasing property is improved.

BRIEF DESCRIPTION OF THE DRAWIGS

Figure 5:
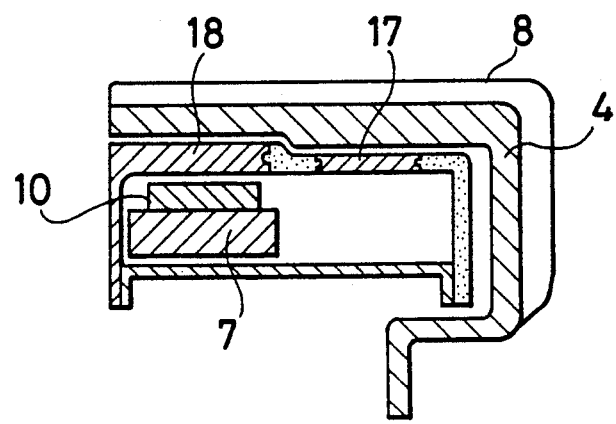
Figure 6:
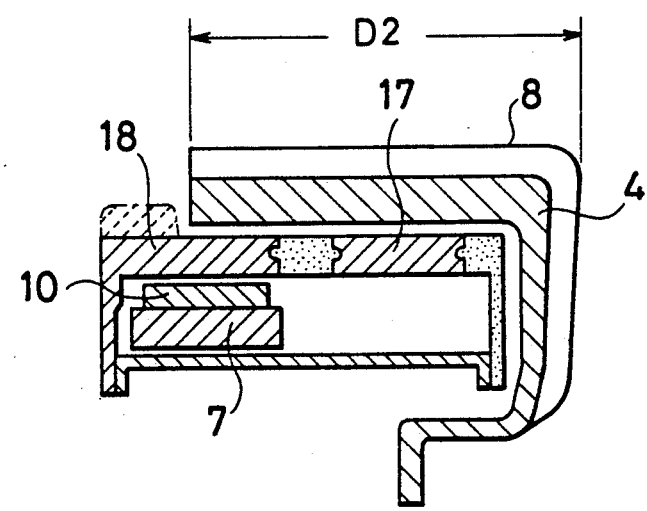
Figure 7:
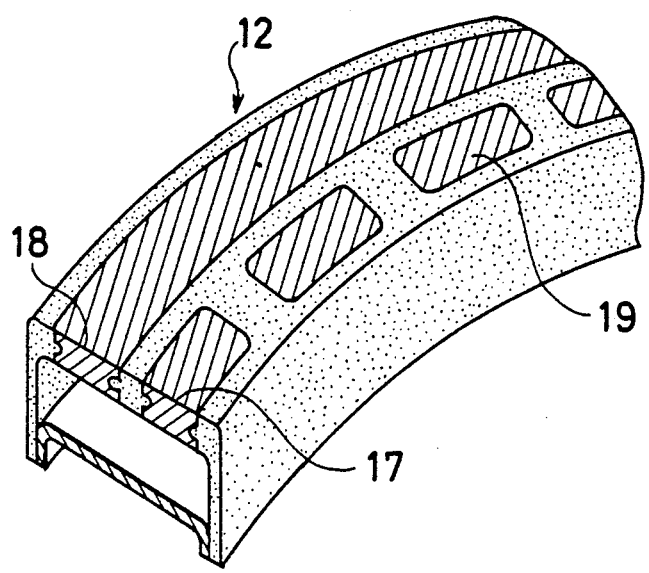
Figure 8:
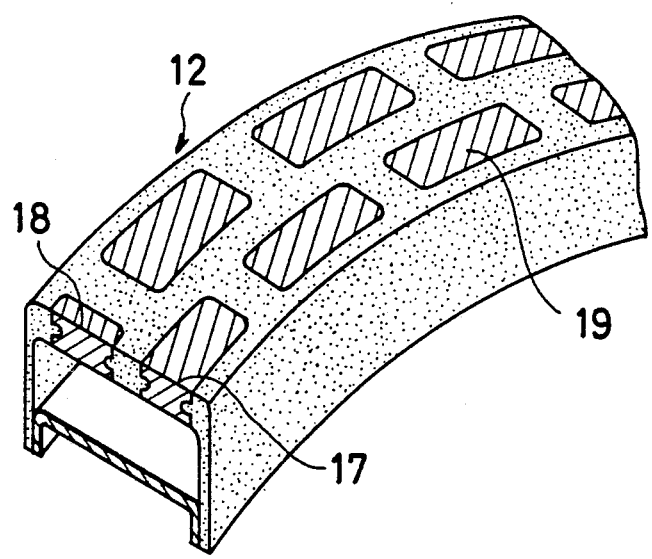
Figure 9:
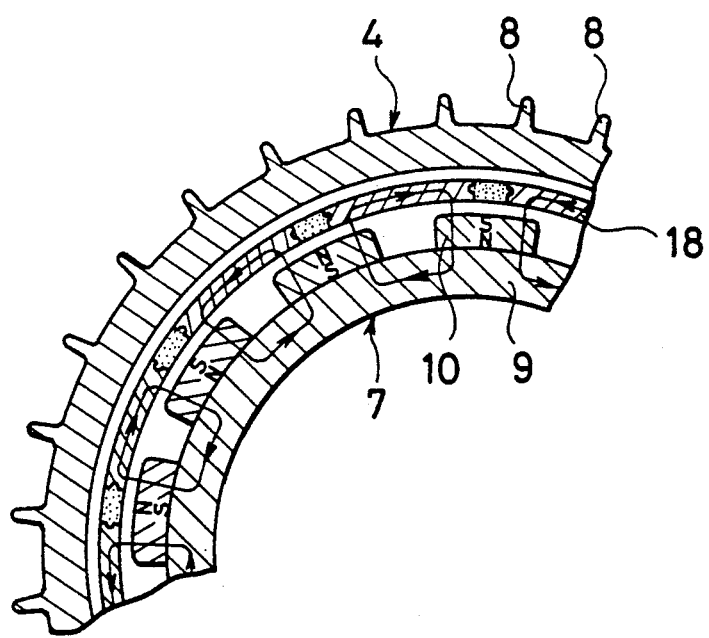

FIGS. 5 and 6 respectively show partial sections of other embodiments of the eddy current type brake system according to the present invention;

FIGS. 7 and 8 respectively show partial perspective views of still other embodiments of the eddy current type brake system according to the present invention; and FIG. 9 is a sectional view illustrating the brake system having a case of FIG. 8 when brake force is released.

DESCRIPTION OF THE PREFERRED EMBODIMENTS

Now, a preferred embodiment of the present invention will be explained.

Figure 1:
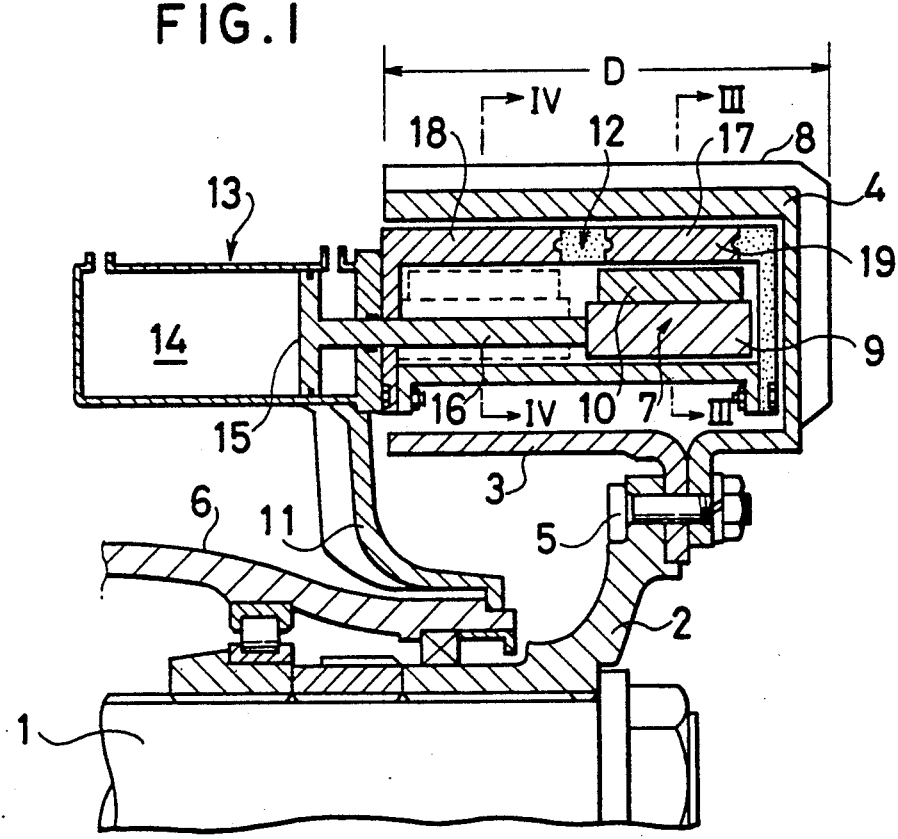
FIG. 1 is a sectional view showing an eddy current type brake system according to the present invention.

Referring to FIG. 1 of the accompanying drawings, a flange part 2 is formed at an output shaft 1 of a transmission of a vehicle. The flange part 2 extends in the radial direction of the shaft 1. A brake drum 3 for a parking brake and a rotor 4 for an eddy current type brake system are mounted on the flange 2 with metal bolts 5.

The rotor 4 is made from conductive and magnetic material and shaped like a drum having a bottom. The rotor 4 is coaxial with the output shaft 1. A stator 7 is supported by a transmission casing 6 and extends inside the hollow-drum-shaped rotor 4. The stator 7 can be moved reciprocatively in a direction parallel to the axis of the drum. Cooling fins 8 are formed on the outer surface of the drum.

The stator 7 includes an annular support ring 9 and permanent magnets 10 provided on the support ring 9. The support ring 9 is coaxial with the output shaft 1. The support ring 9 is supported on the transmission casing 6 by a metallic member 11. The permanent magnets 10 which are major elements of the stator 7 are made from rare earth metal such as neodymium so that the weight thereof is small and the size thereof is compact. The permanent magnets 10 face the inner wall of the drum-like rotor 4. There are provided an even number (between eight and twelve, for example) of permanent magnets 10. The permanent magnets 10 are arranged on the support ring 9 in a manner such that the S pole of one magnet is located next to the N pole of an adjacent permanent magnet with a predetermined interval, i.e., the polarities of the magnets are reversed alternately.

The stator 7 including the permanent magnets 10 and the support ring 9 is sealingly housed in a casing 12 which allows reciprocative movement of the stator 7 in the rotor 4.

The casing 12 is located inside the rotor 4 with a predetermined clearance being maintained between the casing 12 and the rotor 4. An actuator 13 for moving the stator 7 reciprocatively is provided on the casing 12.

As shown in FIG. 1, the actuator 13 has the structure of an air cylinder which includes a cylinder 14, a piston 15 and a push rod 16. The cylinder 14 has a predetermined diameter. The piston 15 is movably housed in the cylinder 14. The push rod 16 connects the piston 15 with the support ring 9 of the stator 7. The piston 15 is moved as pressurized air is fed into the cylinder 14. The stator 7 is reciprocatively moved in the hollow drum (rotor) 4 by the piston 15 via the push rod 16 as the piston 15 is moved.

The casing 12, in which the stator 7 is sealingly housed, is made partially from ferromagnetic material having a high magnetic permeability and partially from non-magnetic material, i.e., magnetically insulting material having a low magnetic permeability. Specifically, as indicated by the solid line in FIG. 1, when the stator 7 is moved to the right in the drawing, the permanent magnets 10 on the stator 7 face a certain part of the casing 12. That part 19 (called "pole piece") of the casing 12 which faces the permanent magnets 10 is made from low-carbon, close-to-pure-iron material (ferromagnetic material) such as ferrite such that the permanent magnets 10 of the stator 7 are magnetically connected with the rotor 4. A portion, in the vicinity of the ferromagnetic material part 19 is made from non-magnetic material such as aluminium. This non-magnetic material portion and the ferromagnetic material part 19 form a brake means 17. In other words, the casing 12 includes the brake means 17 at its right half. The brake means 17 includes a cylindrical plate member integral with the casing 12. The cylindrical member extends along the circumferential direction of the rotor 4.

When the stator 7 is moved to the left in the drawing (FIG. 1), as indicated by the broken line, the permanent magnets 10 face a different part or left half of the casing 12. The left half of the casing 12 forms a brake releasing means 18. The brake releasing means 18 includes ferromagnetic material part made from low-carbon, close-to-pure-iron material such as ferrite, like the pole piece 19, in a manner such that the poles of adjacent magnets on the stator 7 are magnetically short-circuited to magnetically confine the magnetism of the magnets 10 insides the casing 12. The brake releasing means 18 is shaped like a cylindrical plate extending around the permanent magnets 10. The brake releasing means 18 is continuous to the brake applying means 17.

Figure 2:
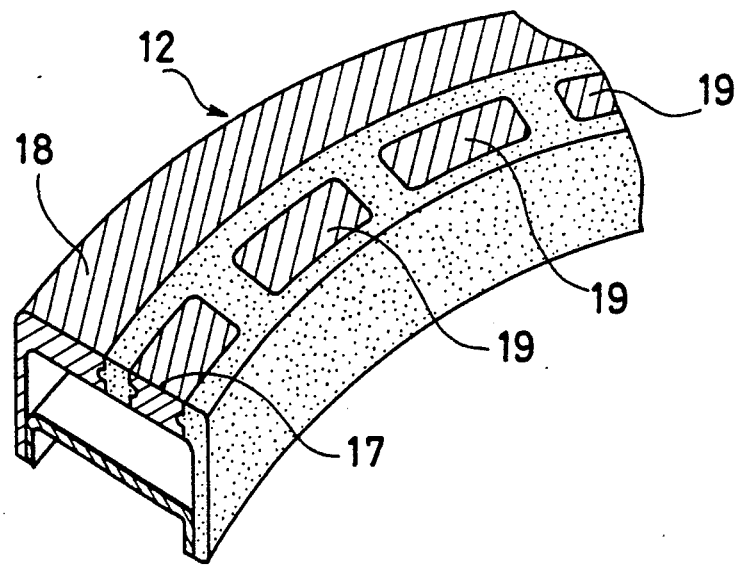
FIG. 2 is a partical perspective view of a casing illustrated in FIG. 1.

FIG. 2 shows a fragmentally perspective view of the casing 12. As illustrated, the casing 12 includes the ferromagnetic part (oblique lines) and the non-magnetic part (dots). Among the ferromagnetic part, the pole pieces 19 of the brake means 17 are spaced along the circumferential direction of the array of the magnets 10 (FIG. 1) in a manner such that one pole piece 19 makes a pair with one permanent magnet 10. The magnets 10 are mounted on the support ring 9 at predetermined intervals. The pole pieces 19 extend non-continuously. On the other hand, the ferromagnetic brake releasing means 18 continuously extends around the brake means 17.

Figure 3:
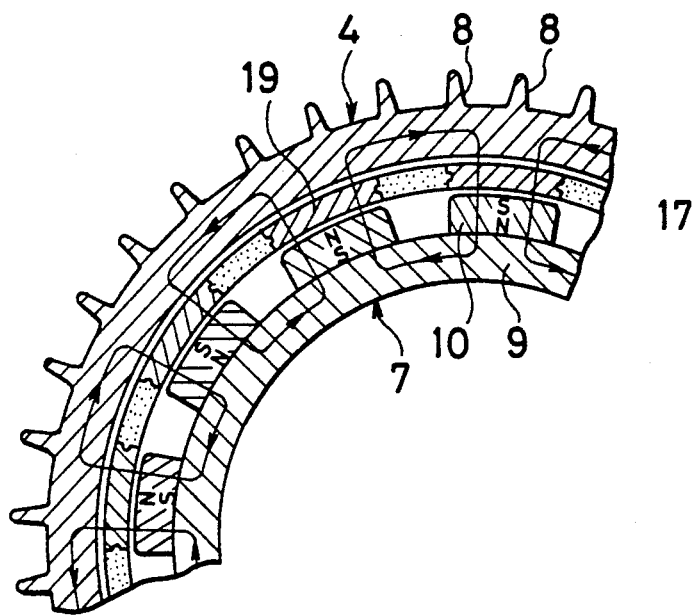
FIG. 3 is a view taken along the line III—III of FIG. 1.

Now, the operation of the arrangement will be explained. When the brake force is applied to the vehicle by the eddy current type brake system, the stator 7 is moved to the right by the actuator 13, as indicated by the solid line of FIG. 1, so as to face the brake means 17. Then, each two adjacent magnets 10 form a magnetic circuit, as shown in FIG. 3. Each magnetic circuit extends through the N pole of one magnet 10, the pole piece 19, the rotor 4, the pole piece 19, the S pole of adjacent magnet 10, the N pole of the same magnet, the stator 7, the S pole of the above-mentioned one magnet 10 and the N pole of the same magnet 10. This is because the S poles and the N poles of the magnets are arranged alternatively, because the pole pieces 19, the rotor 4 and the present ring 9 are made from ferromagnetic material and because the non-magnetic part is formed between each two adjacent ferromagnetic part 19. The non-magnetic part allows the magnetic circuit to reach the rotor 4. Therefore, the eddy control flows through the rotor 4 and the brake force is applied to the rotor 4. As a result, the rotation of the output shaft 1 (FIG. 1) connected to the rotor 4 or the vehicle is decelerated. In this situation, the rotor 4 generates heat due to the eddy current. The eddy current is the energy loss.

Figure 4:
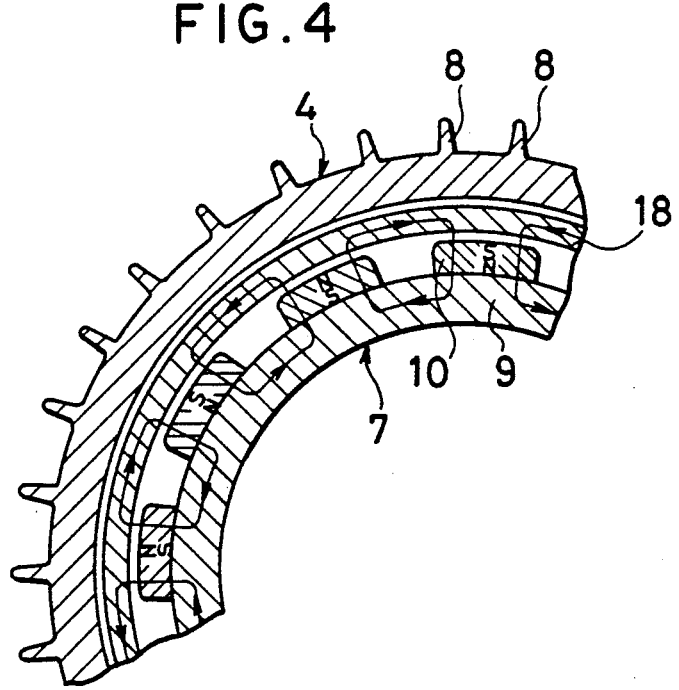
FIG. 4 is a view taken along the line IV—IV of FIG. 1.

The stator 7 or the magnets 10 are moved to the left in FIG. 1 by the actuator 13 when the brake force is released, as indicated by the broken line in FIG. 1. At this point, the magnets 10 face the brake releasing means 18. When the magnets 10 face the brake releasing means 18, as shown in FIG. 4, magnetic circuits different from the above-described case are formed. Specifically, the magnetic circuit at the brake releasing situation extends through the N pole of one magnet 10, the pole piece 19, the S pole of adjacent magnet 10, the N pole of the same magnet, the stator 7, the S pole of the above-mentioned one magnet 10 and the N pole of the same magnet 10. Unlike the magnetic circuit of FIG. 3, the magnetic circuit of FIG. 4 does not extend into the rotor 4. This is because the brake releasing means 18 prevents the magnetic circuit from going into the rotor 4. Therefore, the magnetism of the permanent magnets 10 does not leak into the rotor 4. Accordingly, the eddy current is not produced in the rotor 4. This means that the brake force is no longer applied to the vehicle.

The rotor 4 can have a large drum width D which extends the entire path of reciprocative movement of the stator 7. This means that the rotor 4 can have a large surface area and that the heat releasing efficiency is improved. The surface area of the cooling fins 8 can be enlarged as the surface area of the rotor 4 is enlarged. Thus, more effective cooling of the rotor 4 can be expected.

The eddy current type brake system having the above-described structure ensures the rotor 4 has a maximum surface area in a limited space in the vehicle and sufficient cooling of the rotor 4 is realized. The eddy current can flow easily as the temperature of the rotor 4 is maintained low since the electrical resistance of the rotor 4 is maintained low. This means continuous, stable and reliable braking. In addition, the deformation and cracking of the rotor 4 due to the heat are prevented. This prolongs the longevity of the brake system.

FIGS. 5 and 6 show other embodiments of the present invention. In these drawings, the same numerals are given to like element described in the foregoing embodiment.

Referring to FIG. 5, the thickness of the brake releasing means 18 is made thicker than the thickness of the brake means 17. The thicker brake releasing means 18 ensures a more reliable prevention of the magnetism leakage to the rotor 4. If the magnetism leaks into the rotor 4, the brake force is kept applied to the rotor 4 even if the stator 7 comes to the left most position in the drawing.

Referring to FIG. 6, the drum width D2 of the rotor 4 is shorter than the drum width D of the rotor 4 of FIG. 1. The rotor 4 is cut at the left end in a manner such that the cutting off of a part of the rotor 4 does not affect the heat releasing property of the rotor 4 very much. This structure reduces the inertia of the rotor 4.

FIGS. 7 and 8 show still other embodiments according to the present invention, respectively.

In FIG. 7, the brake releasing means 18 of the casing 12 is modified. As illustrated, only that part of the brake releasing means 18 that faces the rotor 4 is made from ferromagnetic material along the circumferential direction of the rotor 4.

In FIG. 8, the brake releasing means 18 is separated into pieces (In FIG. 7, the means 18 is a single element). The separated pieces 18 are arranged in the circumferential direction of the rotor 4 in a manner such that the positions of the brake releasing pieces 18 do not correspond to the pole pieces 19 directly. According to this arrangement, when the stator 7 is moved from the braking position (rightmost position in FIG. 1) to the brake releasing position (leftmost position in FIG. 1), the magnetic flux of the permanent magnets 10 is effectively stopped by the separate pieces 18 so that the flux does not reach the rotor 14, as shown in FIG. 9.

We claim:

1. An eddy current type brake system adapted to a vehicle, the vehicle having a shaft rotating with an engine of the vehicle, comprising:

a rotor connected to the shaft, the rotor having an axial direction;

a stator provided inside the rotor in a manner such that the stator can move in the axial direction of the rotor, the stator having a circumferential direction;

magnets mounted on the stator in the circumferential direction of the stator at intervals in a manner such that polarities of the magnets are reversed alternately;

braking means formed between the stator and the rotor for magnetically connecting the magnets on the stator with the rotor to apply a brake force to the rotor; and brake releasing means formed between the stator and the rotor for magnetically disconnecting the magnet from the rotor to release the rotor from the brake force.

2. The brake system of claim 1, wherein the braking means and the brake releasing means respectively extend in a direction parallel to the axial direction of the rotor.

3. The brake system of claim 2, wherein the braking means includes ferromagnetic members continuously extending in the circumferential direction of the stator.

4. The brake system of claim 3, wherein the brake releasing means includes a ferromagnetic member extending in the circumferential direction of the stator.

5. The brake system of claim 3, wherein the brake releasing means includes members made from the ferromagnetic material and members made from non-magnetic material, and the ferromagnetic members are spaced in the circumferential direction of the stator in a manner such that the ferromagnetic members of the brake releasing means do not directly face the ferromagnetic member of the braking means.

6. The brake system of claim 4, wherein the brake means is thinner than the brake releasing means.

7. The brake system of claim 1, further including cooling fins on the rotor.

8. The brake system of claim 1, wherein the shaft is an output shaft of a transmission of the vehicle.

9. The brake system of claim 8, wherein a drum for a parking brake is also mounted with the rotor.

10. The brake system of claim 1, wherein the permanent magnet is made from rare earth material.

* * * * *